United States Patent
Hegde et al.

(10) Patent No.: US 7,343,380 B2
(45) Date of Patent: Mar. 11, 2008

(54) CROSS PLATFORM LOCALE DATA NAME MAPPING INTERFACES AND METHODS OF USE THEREOF

(75) Inventors: Prabhat Hegde, Sunnyvale, CA (US); Ienup Sung, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 538 days.

(21) Appl. No.: 10/301,523

(22) Filed: Nov. 20, 2002

(65) Prior Publication Data

US 2003/0126124 A1 Jul. 3, 2003

Related U.S. Application Data

(60) Provisional application No. 60/331,974, filed on Nov. 21, 2001.

(51) Int. Cl.
*G06F 17/30* (2006.01)
(52) U.S. Cl. .............. 707/102; 707/3; 707/10; 707/100
(58) Field of Classification Search ............ 707/3, 707/10, 102, 100; 715/744, 746, 747
See application file for complete search history.

(56) References Cited

U.S. PATENT DOCUMENTS

| | | | |
|---|---|---|---|
| 5,687,366 A * | 11/1997 | Harvey et al. .............. 707/10 |
| 5,909,576 A * | 6/1999 | Fulk ............................. 719/321 |
| 6,408,302 B1 * | 6/2002 | Lee et al. ..................... 707/102 |
| 6,701,428 B1 * | 3/2004 | Harvey et al. ............... 713/1 |
| 6,867,789 B1 * | 3/2005 | Allen et al. .................. 715/744 |
| 6,931,638 B2 * | 8/2005 | Daynes et al. ............... 718/1 |
| 7,058,645 B2 * | 6/2006 | Seto et al. ..................... 707/101 |
| 2002/0078129 A1 | 6/2002 | French et al. |
| 2002/0078169 A1 * | 6/2002 | French et al. ............... 709/218 |
| 2002/0133638 A1 * | 9/2002 | Daynes et al. ............... 709/315 |
| 2002/0174173 A1 * | 11/2002 | Gunturu ..................... 709/203 |
| 2002/0188701 A1 * | 12/2002 | Brown et al. ............... 709/220 |
| 2004/0158835 A1 * | 8/2004 | Harvey et al. .............. 718/104 |

OTHER PUBLICATIONS

Schulz et al. A thread-aware debugger with an open interface, International Synposium of Software Testing and Analysis, pp. 201-211, 2000.*
Yang et al. Cross-PLatform Performance Prediction of Parallel Application Using Partial Execution, Conference on High Performance Networking and Computing, pp. 40, 2005.*
Cierniak et al. Open runtime platform: flexibility with performance using interface, Java grande Conference, pp. 156-164, 2002.*

(Continued)

*Primary Examiner*—John Breene
*Assistant Examiner*—Baoquoc N. To
(74) *Attorney, Agent, or Firm*—Darby & Darby PC; John W. Branch

(57) ABSTRACT

A method of mapping locale data names stored in a cross platform database is disclosed. In the described embodiment, the database is formatted and the attributes are loaded in the formatted database. An attribute associated with a source platform is selected and the database is queried for the selected attribute. The selected attribute is then provided to the target platform.

10 Claims, 4 Drawing Sheets

OTHER PUBLICATIONS

Helsinger et al. Tools and techniques for performance measurement of large distrbuted mutiagent systems, International conference on Autonomous Agents, pp. 842-850, 2003.*

Peviczky et al. Application Program Interface for Real-Time Receding Horizon Control, 44th IEEE Conference, pp. 1331-1336, Dec. 12-15, 2005.*

Tarver et al. Software defined readios (SDR) platform and application program interface (API), Military Communications conference, vol. 1, pp. 153-157, Oct. 21-28, 2001.*

Soferman et al. Advanced graphics behind medical virtual reality: evolution of algorithms, hardware, and software interfaces, Proceeding of the IEEE, vol. 88, Issue. 3, pp. 531-554, Mar. 1998.*

Aldred et al. An application program interface for collaborative working, telecommunication 1993, pp. 146-151, Apr. 18-21, 1993.*

* cited by examiner

Table 1

CROSS PLATFORM LOCALE DATA NAME MAPPING INTERFACES AND METHODS OF USE THEREOF

CROSS REFERENCE TO RELATED APPLICATIONS

This application claims the benefit of U.S. Provisional Application No. 60/331,974, filed Nov. 21, 2001, incorporated herein by reference in its entirety and for all purposes.

BACKGROUND OF THE INVENTION

1. Field of Invention

This invention relates generally to computing systems. Specifically, provides a system, apparatus and method for compatible inter-platform naming of any number of attributes in a computing system.

2. Description of Related Art

There is the increasing demand of users for a computing environment that is in harmony with their own cultural and linguistic requirements. Users want applications and file formats that they can share with colleagues and customers an ocean away, application interfaces in their own language, and time and date displays that they understand at a glance. Essentially, users want to write and speak at the keyboard in the same way that they always write and speak. One potential solution to this problem is incorporated in the Unicode Worldwide Character Standard, or more commonly referred to simply as Unicode. Unicode, or Universal Codeset, is a universal character encoding scheme developed and promoted by the Unicode Consortium that encompasses most alphabetic, ideographic, and symbolic characters used on computers today. As currently implemented, Unicode is a system for "the interchange, processing, and display of the written texts of the diverse languages of the modern world" that also supports many classical and historical texts in a number of languages. Currently, the Unicode standard contains 34,168 distinct coded characters derived from 24 supported language scripts that cover the principal written languages of the world.

There are many attributes that are needed to define a country's cultural conventions. These attributes include the country's native language, the formatting of the date and time, the representation of numbers, the symbols for currency, etc. These local "rules" are termed the country's locale. A locale is a set of language and cultural data that is dynamically loaded into memory at runtime. Users can set the cultural aspects of their local work environment by setting specific variables in a locale. These settings are then applied to the operating system and to subsequent application launches.

Unfortunately, however, each platform (i.e., Solaris™, Java™, MSFT Windows™ 20x, NT, etc.) and various programming languages (C, for example) have their own established naming conventions for codeset/character sets, locale names, iconv (code conversion APIs) names, and the like. Accordingly, mid-tier applications that have to be internationalized must deal with multiple languages and/or platforms and are forced to deal with any incompatibilities that arise due to any inconsistent namings.

Therefore what is desired is an API, method, and system that provides an inter-platform naming compatibility interface.

SUMMARY OF THE INVENTION

According to the present invention, an API, method, and system that provides an inter-platform naming compatibility interface is disclosed.

In one embodiment, a method of mapping locale data names stored in a cross platform database is disclosed. In the described embodiment, a database is loaded after which, attributes are loaded into the database. An attribute is selected associated with a source platform and the database is queried for the selected attribute. The selected attribute is then provided from the database.

In another embodiment an apparatus for mapping locale data names in a cross platform data base is disclosed.

In yet another embodiment, computer program product for mapping locale data names in a cross platform data base is disclosed.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

As described above, a locale is a set of language and cultural data that is dynamically loaded into memory at runtime. Users can set the cultural aspects of their local work environment by setting specific variables in a locale. These settings are then applied to the operating system and to subsequent application launches. Each locale has one or more codesets associated with it. A codeset includes the coded representation of characters used in a particular language. Codesets may span one-byte (for alphabetic languages) or two or more bytes for ideographic languages. Each codeset assigns its own code-point values to each character, without any inherent relationship to other codesets. That is, a code-point value that represents the letter 'a' in a Roman character set will represent another character entirely in the Cyrillic or Arabic system, and may not represent anything in an ideographic system. In Unicode, every character, symbol, and ideograph has its own unique character code. As a result, there is no overlap or confusion between the code-point values of different codesets.

In a described embodiment of the invention, an operating system (such as for example, the Solaris™ created by Sun Microsystems, Inc. of Mountain View Calif.) includes an application programming interface (or API) that enables a developer to access directly the cultural data of a particular locale such as, for example, an application will not need to encode the currency symbol for a particular region. By calling the appropriate system API, the API returns the symbol associated with the current currency symbol the user has specified. In this way, applications can run in any locale without having special knowledge of the cultural or language information associated with the locale.

Figure 1:
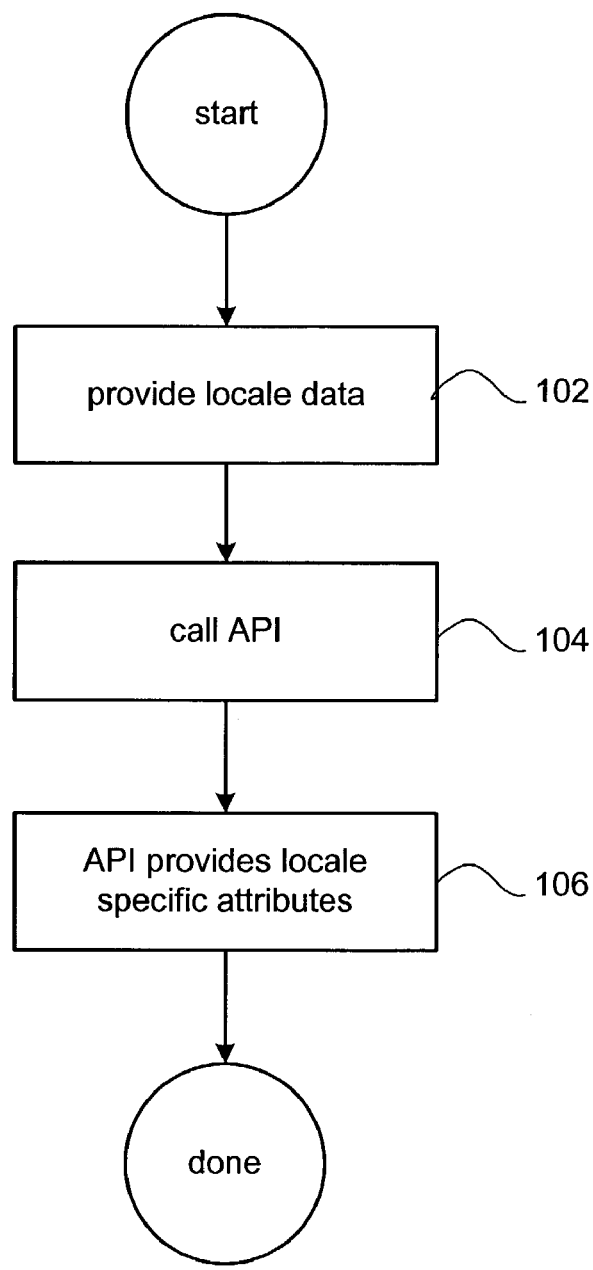
FIG. 1 is a flowchart detailing a process 100 for providing locale specific attributes in accordance with an embodiment of the invention.

In a particular embodiment, a method of mapping locale data names stored in a cross platform database is disclosed. In the described embodiment, the database is formatted and the attributes are loaded in the formatted database. An attribute associated with a source platform is selected and the database is queried for the selected attribute. The selected attribute is then provided to the target platform Accordingly, FIG. 1 is a flowchart detailing a process 100 for providing locale specific attributes in accordance with an embodiment of the invention. The process 100 begins at 102 by providing a locale data set and at 104 by calling the inventive API. At 106, the API responds by providing the locale specific attributes.

Figure 2:
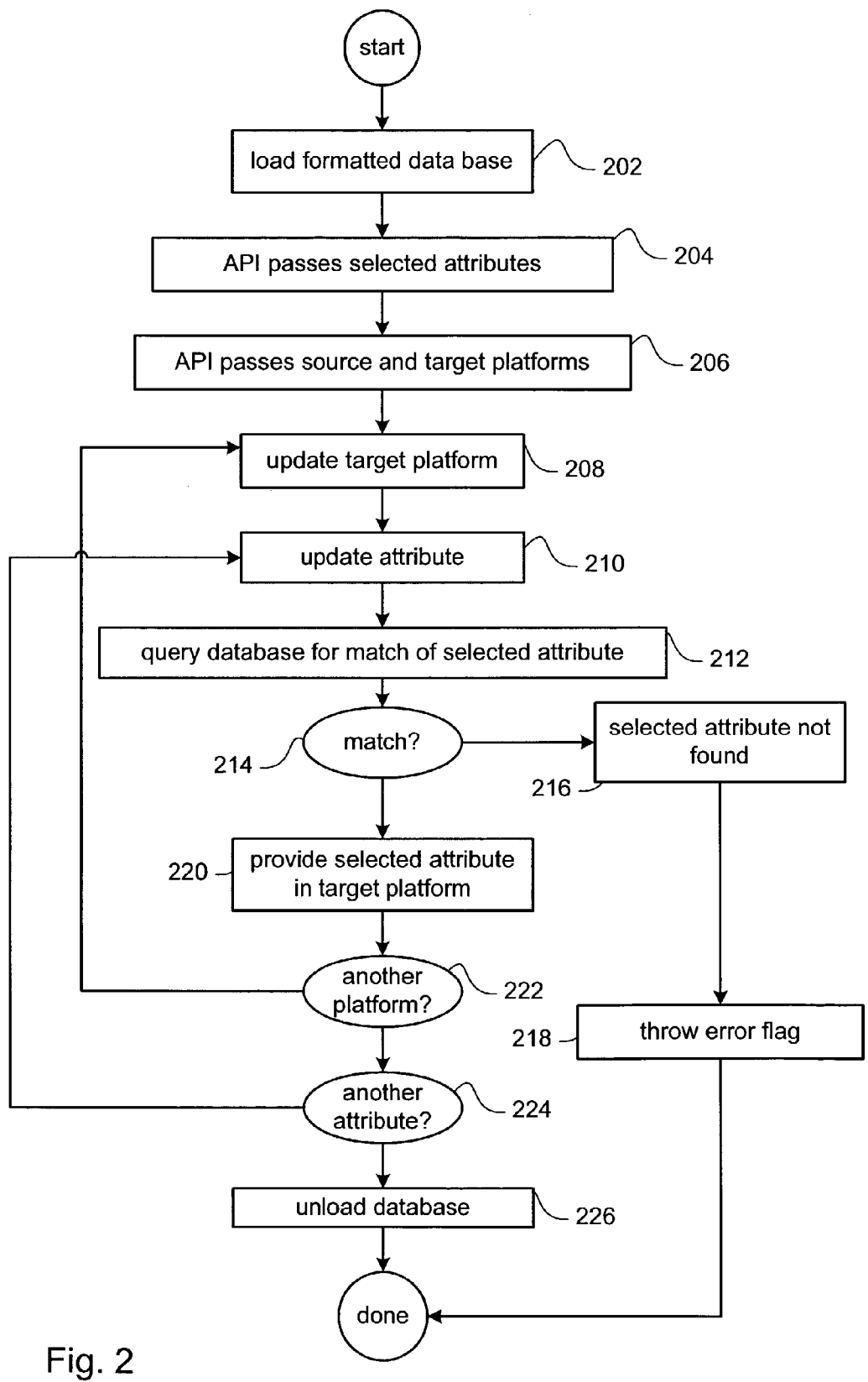
FIG. 2 is a flowchart detailing a process as an embodiment of the call API operation of the process.
Figure 3:
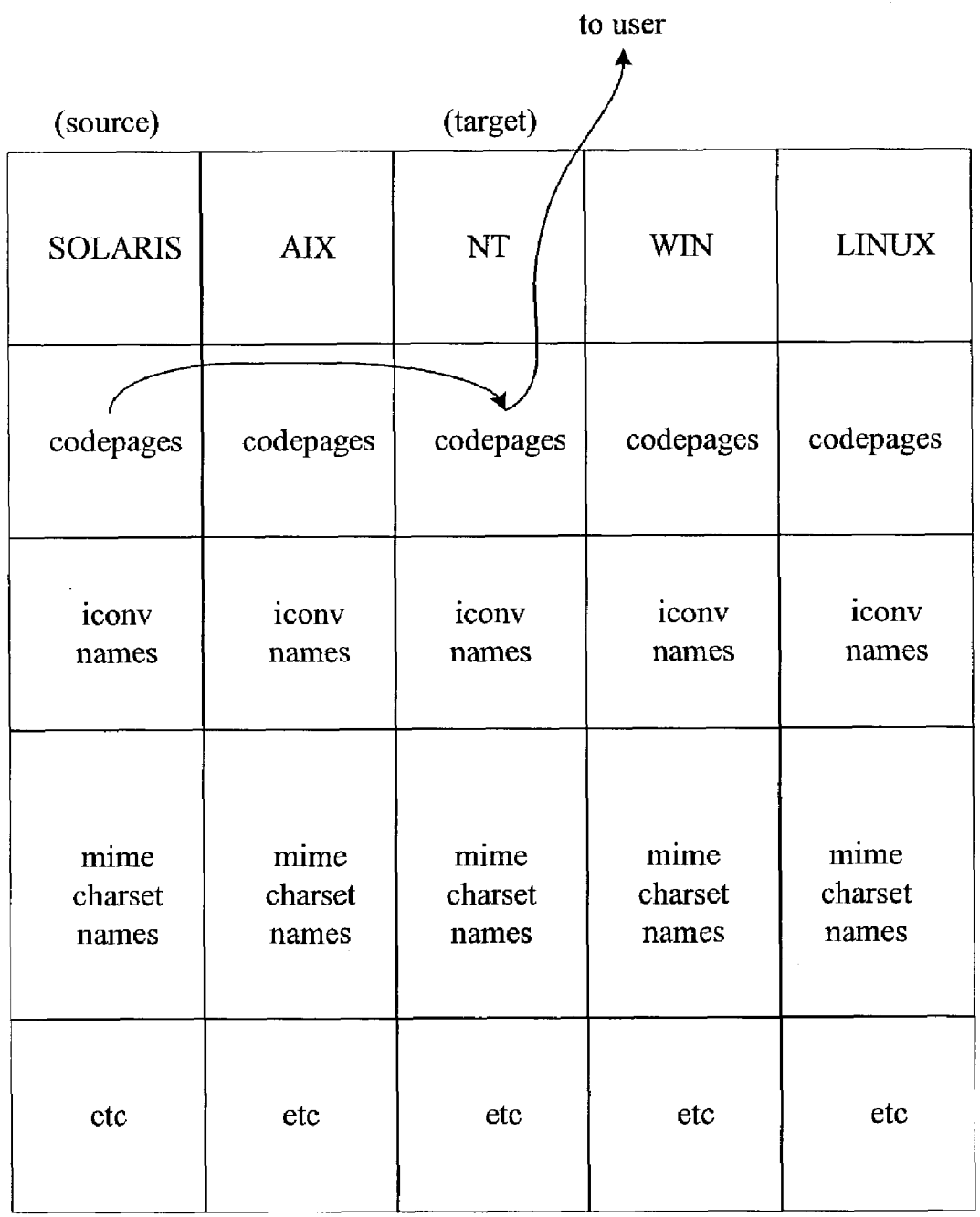
FIG. 3 show an exemplary data base into which a number of platforms and their associated attributes are stored.

In more detail, FIG. 2 is a flowchart detailing a process 200 as an embodiment of the call API operation 102 of the process 100. More particularly, the process 200 begins at 202 by loading a formatted database suitable for storing of the desired locale attributes. At 204, the API passes selected attributes to the database. At 206, the API passes source and target platforms. For example, referring to Table 1 in FIG. 3 showing an exemplary data base 300 into which a number of platforms and their associated attributes are stored where for this example only, the SOLARIS operating system is the source platform and Windows NT is the target platform where the selected attribute for conversion is "codepages".

Returning back to FIG. 2, once the API has passed the source and target platforms, the target platform is updated at 208 and the selected attribute is updated at 210. At 212, the database is queried to determine if the selected attribute is included in the database as indicated by a match. If a match does not occur at 214, then the selected attribute is not found at 216 and an error flag is thrown at 218. Otherwise, when a match is found, then the selected attribute is provided to the target database at 220 and at 222 a determination is made whether or not there is another target platform. If there is another target platform, then the target platform is updated at 208, otherwise control is passed to 224 where a determination is made whether or not the is another attribute for conversion. If there is another attribute, then control is passed to 210 where the attribute is updated, otherwise control is passed to 226 where the database is uploaded after which processing stops.

Figure 4:
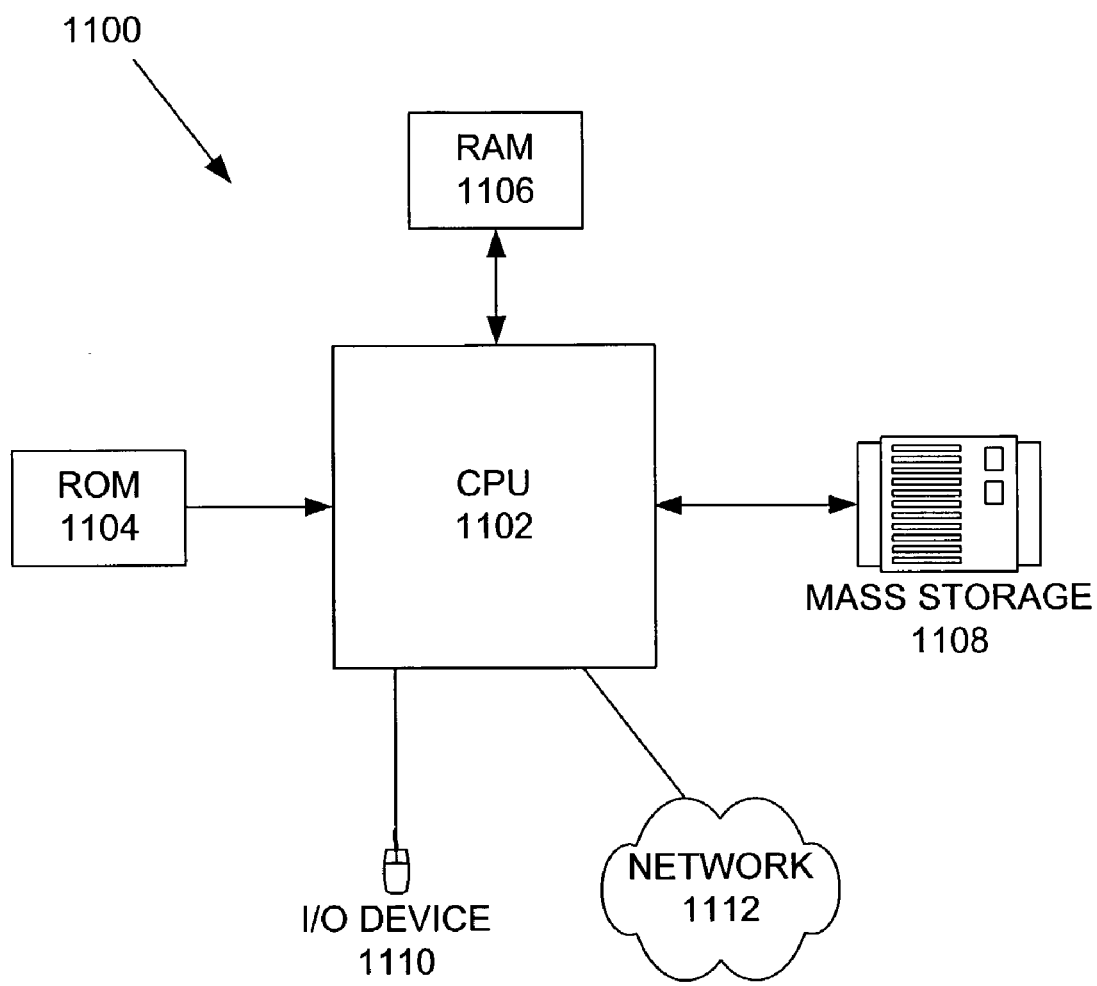
FIG. 4 illustrates a computer system employed to implement the invention.

FIG. 4 illustrates a computer system 1100 employed to implement the invention. The computer system 1100 or, more specifically, CPUs 1102, may be arranged to support a virtual machine, as will be appreciated by those skilled in the art. As is well known in the art, ROM acts to transfer data and instructions uni-directionally to the CPUs 1102, while RAM is used typically to transfer data and instructions in a bi-directional manner. CPUs 1102 may generally include any number of processors. Both primary storage devices 1104, 1106 may include any suitable computer-readable media. A secondary storage medium 1108, which is typically a mass memory device, is also coupled bi-directionally to CPUs 1102 and provides additional data storage capacity. The mass memory device 1108 is a computer-readable medium that may be used to store programs including computer code, data, and the like. Typically, mass memory device 1108 is a storage medium such as a hard disk or a tape which generally slower than primary storage devices 1104, 1106. Mass memory storage device 1108 may take the form of a magnetic or paper tape reader or some other well-known device. It will be appreciated that the information retained within the mass memory device 1108, may, in appropriate cases, be incorporated in standard fashion as part of RAM 1106 as virtual memory. A specific primary storage device 1104 such as a CD-ROM may also pass data uni-directionally to the CPUs 1102.

CPUs 1102 are also coupled to one or more input/output devices 1110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1102 optionally may be coupled to a computer or telecommunications network, e.g., an Internet network or an intranet network, using a network connection as shown generally at 1112. With such a network connection, it is contemplated that the CPUs 1102 might receive information from the network, or might output information to the network in the course of performing the above-described method steps. Such information, which is often represented as a sequence of instructions to be executed using CPUs 1102, may be received from and outputted to the network, for example, in the form of a computer data signal embodied in a carrier wave. The above described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the multi-platform compiler can be used in any computing system.

While the present invention has been described as being used with a UNIX based operating system on a computer system, it should be appreciated that the present invention may generally be implemented on any suitable computing system having a compiler. Therefore, the present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are may alternative ways of implementing both the process and apparatus of the present invention. It is therefore intended that the invention be interpreted as including all such alterations, permutations, and equivalents as fall within the true spirit and scope of the present invention.

What is claimed is:

1. A computer-implemented method of mapping locale data names stored in a cross platform database, comprising:

loading into a memory at runtime a formatted database suitable for storing locale attributes, the locale attributes specifying a set of language and cultural data that is dynamically loaded into memory by a locale-assessing Application Program Interface and that specifies aspects of a country's local conventions;

loading the locale attributes in the formatted database;
selecting one of the locale attributes associated with a source platform;
querying the formatted database for the selected one of the locale attributes by the locale-assessing Application Program Interface;
providing the selected one of the locale attributes to a target platform; and
unloading the formatted database from the memory upon completion of runtime.

2. A method as recited in claim 1, wherein the loading comprises:
passing the locale attributes by using the locale-assessing application programming interface from the source platform to the target platform.

3. A method as recited in claim 1, further comprising:
throwing an error flag when the selected one of the locale attributes is not found in the formatted database by the querying.

4. A method as recited in claim 1, wherein the formatted database is a codepages database.

5. A method as recited in claim 1, wherein the source platform is selected from a group comprising: a SOLARIS platform, an AIX platform, a WINDOWS NT platform, a WINDOWS platform, and a L1NUX platform.

6. An apparatus for mapping locale data names stored in a cross platform database, comprising:
a means for loading into a memory at runtime a formatted database suitable for storing locale attributes, the locale attributes specifying a set of language and cultural data that is dynamically loaded into the memory by a locale-assessing Application Program Interface and that specifies aspect of a country's locale conventions;
a means for loading the locale attributes in the formatted database;
a means for selecting one of the locale attributes associated with a source platform;
a means for querying the formatted database for the selected one of the locale attributes by the locale-assessing Application Program Interface;
a means for providing the selected one of the locale attributes to a target platform; and
a means for unloading the formatted database for the memory upon completion of runtime.

7. An apparatus as recited in claim 6, wherein the loading means comprises:
a means for passing the locale attributes by using the locale-assessing application programming interface from a means for the source platform the target platform.

8. An apparatus as recited in claim 6, further comprising:
a means for throwing an error flag when the selected one of the locale attributes is not found in the formatted database by the querying.

9. An apparatus as recited in claim 6, wherein the formatted database is a codepages database.

10. An apparatus as recited in claim 6, wherein the source platform is selected from a group comprising:
a SOLARIS platform, an AIX platform, a WINDOWS NT platform, a WINDOWS platform, and a L1NUX platform.

\* \* \* \* \*

UNITED STATES PATENT AND TRADEMARK OFFICE
CERTIFICATE OF CORRECTION

| | |
|---|---|
| PATENT NO. | : 7,343,380 B2 |
| APPLICATION NO. | : 10/301523 |
| DATED | : March 11, 2008 |
| INVENTOR(S) | : Hegde et al. |

It is certified that error appears in the above-identified patent and that said Letters Patent is hereby corrected as shown below:

On the title page, item (56), under "Other Publications", in column 2, line 2, delete "Synposium" and insert -- Symposium --, therefor.

On the title page, item (56), under "Other Publications", in column 2, line 4, delete "PLatform" and insert -- Platform --, therefor.

On Page 2, item (56), under "Other Publications", in column 1, line 2, delete "distrbuted mutiagent" and insert -- distributed multiagent --, therefor.

In column 1, line 39, delete "modem" and insert -- modern --, therefor.

In column 3, line 17, after "platform" insert -- . --.

In column 3, line 48, delete "the" and insert -- there --, therefor.

In column 4, line 52, delete "may" and insert -- many --, therefor.

In column 5, line 25, in Claim 5, delete "L1NUX" and insert -- LINUX --, therefor.

In column 5, line 33, in Claim 6, delete "aspect" and insert -- aspects --, therefor.

In column 5, line 33, in Claim 6, delete "locale" and insert -- local --, therefor.

In column 6, line 11, in Claim 6, delete "for" and insert -- from --, therefor.

In column 6, line 18, in Claim 7, after "platform" insert -- to --.

UNITED STATES PATENT AND TRADEMARK OFFICE
CERTIFICATE OF CORRECTION

| | |
|---|---|
| PATENT NO. | : 7,343,380 B2 |
| APPLICATION NO. | : 10/301523 |
| DATED | : March 11, 2008 |
| INVENTOR(S) | : Hegde et al. |

It is certified that error appears in the above-identified patent and that said Letters Patent is hereby corrected as shown below:

In column 6, line 30, in Claim 10, delete "L1NUX" and insert -- LINUX --, therefor.

Signed and Sealed this

First Day of July, 2008

JON W. DUDAS
*Director of the United States Patent and Trademark Office*